Figure 1:
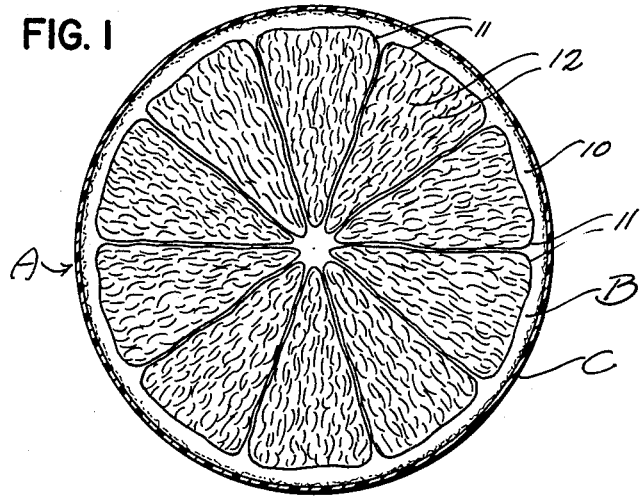

Dec. 11, 1962 P. M. HALL 3,068,106
PROCESS FOR THE RECOVERY OF JUICES FROM FRUIT SUCH
AS CITRUS FRUIT AND PRODUCT OBTAINED THEREFROM
Filed Nov. 2, 1961

INVENTOR
Preston M. Hall

BY *Lancaster, Allwine and Rommel*
ATTORNEYS

3,068,106
PROCESS FOR THE RECOVERY OF JUICES FROM FRUIT SUCH AS CITRUS FRUIT AND PRODUCT OBTAINED THEREFROM
Preston M. Hall, 9612 Merwood Lane, Silver Spring, Md.
Filed Nov. 2, 1961, Ser. No. 152,116
4 Claims. (Cl. 99—168)

This invention relates to a novel process for the recovery of fruit juices, preferably from citrus fruit such as oranges, grapefruit, citrange, kumquat, tangelo, mandarine, lime, lemon, and the like.

In conventional methods of juice recovery from citrus fruit, it is necessary to cut the fruit and remove the juice by hand or mechanical squeezing operations. This is not only time consuming but messy, and to some extent unsanitary. Chemical changes take place in orange juice soon after extraction because of contact with the air. Thus, all canned orange juice is materially different in taste when compared to fresh orange juice. The taste is less appetizing and less beneficial. With my process the juice is preserved in its original condition, allowing the product to be distributed much as whole oranges or citrus fruits are now handled, but with the advantage that the juice may be easily and quickly freed from the original container ready for instant consumption.

It is a further object of this invention to suitably encase the individual fruit in a non-toxic preferably elastic hermetically sealing coating which will withstand external treatment necessary to rupture the individual juice cells in the fruit as well as the carpel coatings in order that the juice will be entirely freed and maintained within the coating; the latter being impervious to air and moisture. In order to remove the juice it is then only necessary to slit the external applied coating for removal of the juice by pouring or to inject an applicator tube for removal of the juice from the fruit.

A further object of this invention is the provision of a citrus fruit product comprising natural fruit coated with an impervious flexible and preferably elastic coating; the latter being such that when sufficient external force is applied thereto the juice cell structure will be completely ruptured for freeing the juices within the casing.

This application in a continuation-in-part of U. S. application Serial No. 600,478, filed July 27, 1956, and now abandoned.

In the drawing:

FIGURE 1 is a cross sectional view of an orange showing the cell and carpel structure thereof within the rind or epicarp; the same being externally coated and hermetically sealed therein with a strong air and moisture impervious, flexible and elastic casing.

Figure 2:
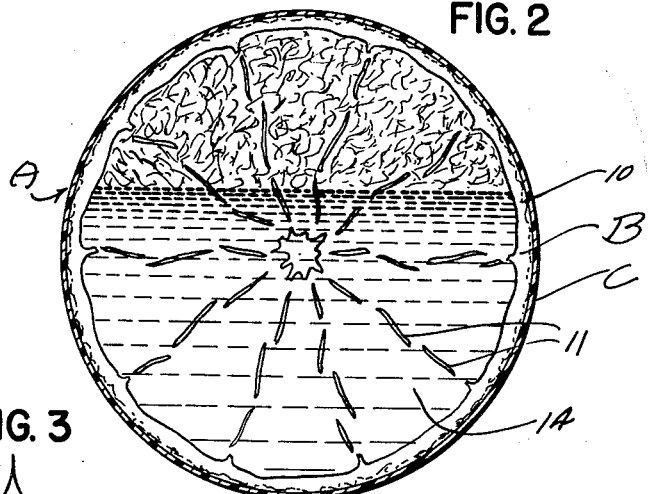

FIGURE 2 is a cross sectional view similar to FIGURE 1 but showing the orange after it has been subjected to some external force, such as pressure treatment, for rupturing the carpel skin and juice cells for freeing the juice within the impervious external casing structure whereby all that is necessary to obtain the juice is to slit the external casing structure or inject a juice removing applicator or appliance thereto.

Figure 3:
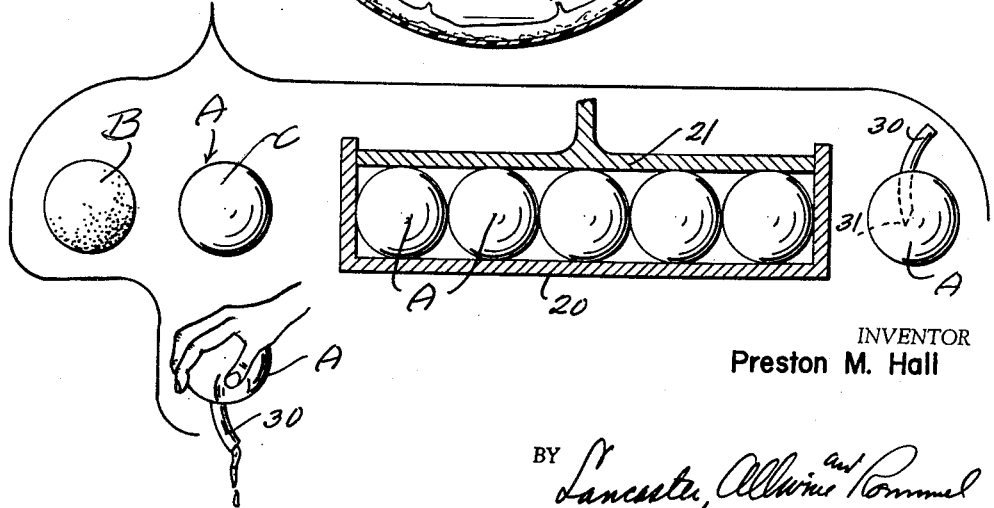

FIGURE 3 is a diagrammatic view showing the various steps for processing the citrus fruit for easy and sanitary removal of juice therefrom.

In the drawing wherein similar reference characters designate corresponding parts throughout the several views, the letter A may generally designate a product which may include an individual citrus fruit B closely encased within a strong flexible and preferably elastic casing C which is impervious to passage of air or moisture therethrough.

The material of the casing C must be strong, flexible, absolutely impervious to passage of liquid, air or moisture therethrough, and preferably elastic. It must be capable of withstanding external treatment such as subjection to compression treatment whereby the entire fruit juice cell structure may be ruptured for completely freeing the juice within the casing C. The casing or membrane C enclosing the citrus fruit may be applied as by spraying, flowing, dipping, brushing, stretching and sealing as by vulcanizing and in the case of vinyl resins I may choose to calender, extrude or cast the film.

The casing does not necessarily have to be sufficiently adhesive to adhere to the surface of the rind. In fact the latter may be broken during the juice cell rupturing step, but preferably the rind should not be mutilated for appreciable release of volatile oils from the rind glands.

The elastomers which can be used comprise natural rubbers, synthetic rubbers as:

Butadiene-styrene rubbers
Chloroprene rubber "(neoprene)"
Nitrile rubbers
Butyl rubber
Fluorocarbon rubber (specifically, Kel-F, a copolymer of chlorotrifluorethylene and vinylidene fluoride)
Hupalon rubber (chlorosulfonated polyethylene)

The ranges of thickness that will satisfy the requirements for natural rubber and synthetic rubber and elastically withstand forces necessary to apply for freeing the juice from the cell structure of the citrus fruit may range from .060 of an inch to .150 of an inch.

Concerning the use of synthetic plastics, vinyl polymers and copolymers can be used. In the vinyl copolymer field polyvinyl chloride-acetate and general purpose polyvinyl chlorides can be used. It is also possible to use dispersion grade resins, in plastisol and organosol techniques.

The thickness ranges of synthetic resins for a casing having the characteristics outlined in the specification may range from .040 of an inch to .100 of an inch.

The coating structure C may be clear, translucent or pigmented.

All of the materials above listed are sufficiently elastic to contract to substantially the original dimensions upon release of the compressive forces.

Referring to FIGURE 1 the citrus fruit B, in case it is an orange, will consist of the rind or epicarp and the usual pulpy carpels 11 which contain hundreds of minute juice cells 12. During the force applicating operation the cells 12 will be ruptured as well as the carpel enclosing membrane or coating for freeing the juice in a body 14 so that the same may be freely poured from the product after slitting, or rupturing the casing with an applicator.

The steps of the process are shown in FIGURE 3 wherein the orange or citrus fruit B is shown at the left of the view. In the second step the coating is applied thereto. In the third step the forces necessary to rupture the juice cells are applied. In FIGURE 3 I have shown by way of example a platform or container 20 which receives the coating covered product A therein wherein the same may be subjected to compressive force by means of a movable platen 21. The forces, in this step of the operation, necessary to rupture the juice cells may consist of compressive rolling, propelling the coated fruit against some rigid surface, and pressure by intermittent squeezing.

As shown at the far right in the diagrammatic view of FIGURE 3, the juice freed product A may be provided with a juice pouring applicator tube 30 provided with a puncturing point 31 at its inner end. This applicator may be provided with means therein to screen the pulp and seeds so that only freed juice will flow from the fruit.

The last and lower view of FIGURE 3 shows an operator inverting the fruit for pouring the juice through the applicator 30.

It will be apparent from the foregoing that a process and a product resulting therefrom have been provided which will result in the economical and sanitary freeing of juice from citrus fruit. The most practical method will be to select fruit according to size in methods well known to the industry; to wash and clean the same and then to apply the coating C. The cell rupturing operation may take place in the packing plant and then the product shipped under suitable refrigerated conditions, or the individually coated fruit in the condition shown in FIGURE 1, prior to cell rupturing, may be shipped to the desired location and then the treatment carried out which is necessary to rupture the juice cell structure.

Various changes in the application of this process to different juice fruits, and various changes and alterations in the steps of processing the fruits may be made without departing from the spirit of the invention or scope of the claims.

I claim:

1. A citrus fruit product comprising natural citrus fruit including a rind and juice cells enclosed therein, and a hermetically sealed air and moisture impervious flexible and elastic casing enclosing the fruit and having a structural strength capable of withstanding forces necessary to rupture the juice cells in the rind for freeing substantially all the juice in the rind without destroying the imperviousness of the casing structure.

2. The steps in the process of freeing juice from citrus fruit which consists in completely externally coating citrus fruit within a flexible air and moisture impervious elastic casing in hermetically sealing relation about the fruit, and subsequently subjecting the casing enclosed fruit to compression treatment which will rupture the juice cells therein for freeing the juice within said casing without destroying the imperviousness of the casing.

3. The citrus fruit product defined in claim 1 in which the thickness of the flexible casing may vary from .040 of an inch to .150 of an inch.

4. The steps in the processing of freeing juice from citrus fruit as defined in claim 2 in which the thickness of the elastic casing may vary from .040 of an inch to .150 of an inch.

References Cited in the file of this patent

UNITED STATES PATENTS 2,558,042     Cornwall _____ June 26, 1951

OTHER REFERENCES

"The Good Housekeeping Cook Book," TX 715–G 62 C2, pp. 69 and 70.